United States Patent
Nicholson et al.

(10) Patent No.: US 11,238,865 B2
(45) Date of Patent: Feb. 1, 2022

(54) FUNCTION PERFORMANCE BASED ON INPUT INTONATION

(71) Applicant: Lenovo (Singapore) Pte. Ltd., Singapore (SG)

(72) Inventors: John Weldon Nicholson, Cary, NC (US); Ming Qian, Cary, NC (US); Song Wang, Cary, NC (US); Ryan Charles Knudson, Durham, NC (US); Roderick Echols, Chapel Hill, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 98 days.

(21) Appl. No.: 16/687,358

(22) Filed: Nov. 18, 2019

(65) Prior Publication Data

US 2021/0151046 A1    May 20, 2021

(51) Int. Cl.
*G10L 15/22* (2006.01)
*G10L 25/63* (2013.01)
*G10L 15/18* (2013.01)
*G10L 15/26* (2006.01)

(52) U.S. Cl.
CPC .......... *G10L 15/22* (2013.01); *G10L 15/1807* (2013.01); *G10L 15/1815* (2013.01); *G10L 15/26* (2013.01); *G10L 25/63* (2013.01); *G10L 2015/223* (2013.01)

(58) Field of Classification Search
CPC . G10L 15/08; G10L 15/1807; G10L 15/1815; G10L 15/22; G10L 25/63; G10L 15/26; G10L 2015/223
See application file for complete search history.

(56) References Cited

U.S. PATENT DOCUMENTS

| | | | | |
|---|---|---|---|---|
| 4,696,042 A * | 9/1987 | Goudie | | G10L 15/04 704/254 |
| 7,434,176 B1 * | 10/2008 | Froloff | | G06F 40/20 715/839 |
| 8,650,199 B1 * | 2/2014 | Tong | | G06F 16/319 707/749 |
| 9,429,947 B1 * | 8/2016 | Wengreen | | B60W 30/00 |
| 9,984,682 B1 * | 5/2018 | Tao | | G09B 19/04 |
| 10,521,189 B1 * | 12/2019 | Ryabov | | G06F 40/289 |
| 10,706,087 B1 * | 7/2020 | Broomall | | G06F 9/542 |
| 10,825,449 B1 * | 11/2020 | Chinnalagu | | G06N 20/00 |

(Continued)

OTHER PUBLICATIONS

Ananthakrishnan, S., "Categorical prosody models for spoken language applications", 2008, Available from ProQuest Dissertations and Theses Professional. Retrieved from https://dialog.proquest.com/professional/docview/304492138?accountid=131444 (Year: 2008).*

(Continued)

*Primary Examiner* — Eric Yen
(74) *Attorney, Agent, or Firm* — Ference & Associates LLC

(57) ABSTRACT

One embodiment provides a method, including: receiving, at an information handling device, audible user input; determining, subsequent to the receiving, an intonation with which the audible user input was provided; assigning, based on the determined intonation, an expressive meaning to the audible user input; and performing, based on the expressive meaning, a corresponding function. Other aspects are described and claimed.

16 Claims, 3 Drawing Sheets

(56) References Cited

U.S. PATENT DOCUMENTS

| | | | | |
|---|---|---|---|---|
| 2002/0069069 | A1* | 6/2002 | Kanevsky | G10L 15/26 704/271 |
| 2003/0154072 | A1* | 8/2003 | Young | G06F 16/40 704/9 |
| 2008/0059186 | A1* | 3/2008 | Mowatt | G10L 15/193 704/257 |
| 2011/0320950 | A1* | 12/2011 | Rajput | G10L 21/043 715/728 |
| 2012/0116756 | A1* | 5/2012 | Kalinli | G10L 15/1807 704/207 |
| 2014/0249811 | A1* | 9/2014 | Doherty | G10L 15/22 704/231 |
| 2014/0272821 | A1* | 9/2014 | Pitschel | G09B 19/06 434/157 |
| 2014/0350918 | A1* | 11/2014 | Liu | G06F 40/30 704/9 |
| 2015/0032460 | A1* | 1/2015 | Kang | G06F 3/167 704/276 |
| 2016/0314786 | A1* | 10/2016 | Byrne | G10L 15/22 |
| 2017/0084269 | A1* | 3/2017 | Shi | G10L 15/063 |
| 2017/0103757 | A1* | 4/2017 | Yamamoto | G10L 15/1807 |
| 2017/0220536 | A1* | 8/2017 | Chiba | G06F 3/167 |
| 2017/0263248 | A1* | 9/2017 | Gruber | G06F 40/166 |
| 2018/0301061 | A1* | 10/2018 | Paudyal | G09B 21/009 |
| 2019/0251990 | A1* | 8/2019 | Nakagawa | G10L 15/26 |
| 2019/0272547 | A1* | 9/2019 | Coman | G06N 3/08 |
| 2019/0362703 | A1* | 11/2019 | Ijima | G10L 13/02 |
| 2020/0066270 | A1* | 2/2020 | Lee | G10L 25/60 |
| 2020/0152194 | A1* | 5/2020 | Jeong | G10L 13/047 |

OTHER PUBLICATIONS

Y. Ijima, H. Nobukatsu, R. Matsumura, and T. Asami, "Prosody aware word-level encoder based on BLSTM-RNNs for DNN-based speech synthesis,", Aug. 2017, INTERSPEECH 2017, Stockholm, Sweden, Aug. 2017, pp. 764-776 (Year: 2017).*

Xin Wang, Shinji Takaki, Junichi Yamagishi, "Enhance the word vector with prosodic information for the recurrent neural network based TTS system", Sep. 2016, INTERSPEECH 2016, San Francisco, USA, Sep. 2016, pp. 2856-2860 (Year: 2016).*

* cited by examiner

FUNCTION PERFORMANCE BASED ON INPUT INTONATION

BACKGROUND

Individuals frequently interact with their information handling devices ("devices"), for example laptop and/or personal computers, tablet devices, smart phones, smart speakers, and the like, throughout the day. More particularly, digital assistant software may be resident on a device that may detect user inputs (e.g., audible voice commands, audible voice statements, etc.) and thereafter perform one or more responsive functions.

BRIEF SUMMARY

In summary, one aspect provides a method, comprising: receiving, at an information handling device, audible user input; determining, subsequent to the receiving, an intonation with which the audible user input was provided; assigning, based on the determined intonation, an expressive meaning to the audible user input; and performing, based on the expressive meaning, a corresponding function.

Another aspect provides an information handling device, comprising: a processor; a memory device that stores instructions executable by the processor to: receive audible user input; determine, subsequent to the receiving, an intonation with which the audible user input was provided; assign, based on the determined intonation, an expressive meaning to the audible user input; and perform, based on the expressive meaning, a corresponding function.

A further aspect provides a product, comprising: a storage device that stores code, the code being executable by a processor and comprising: code that receives audible user input; code that determines, subsequent to the receiving, an intonation with which the audible user input was provided; code that assigns, based on the determined intonation, an expressive meaning to the audible user input; and code that performs, based on the expressive meaning, a corresponding function.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
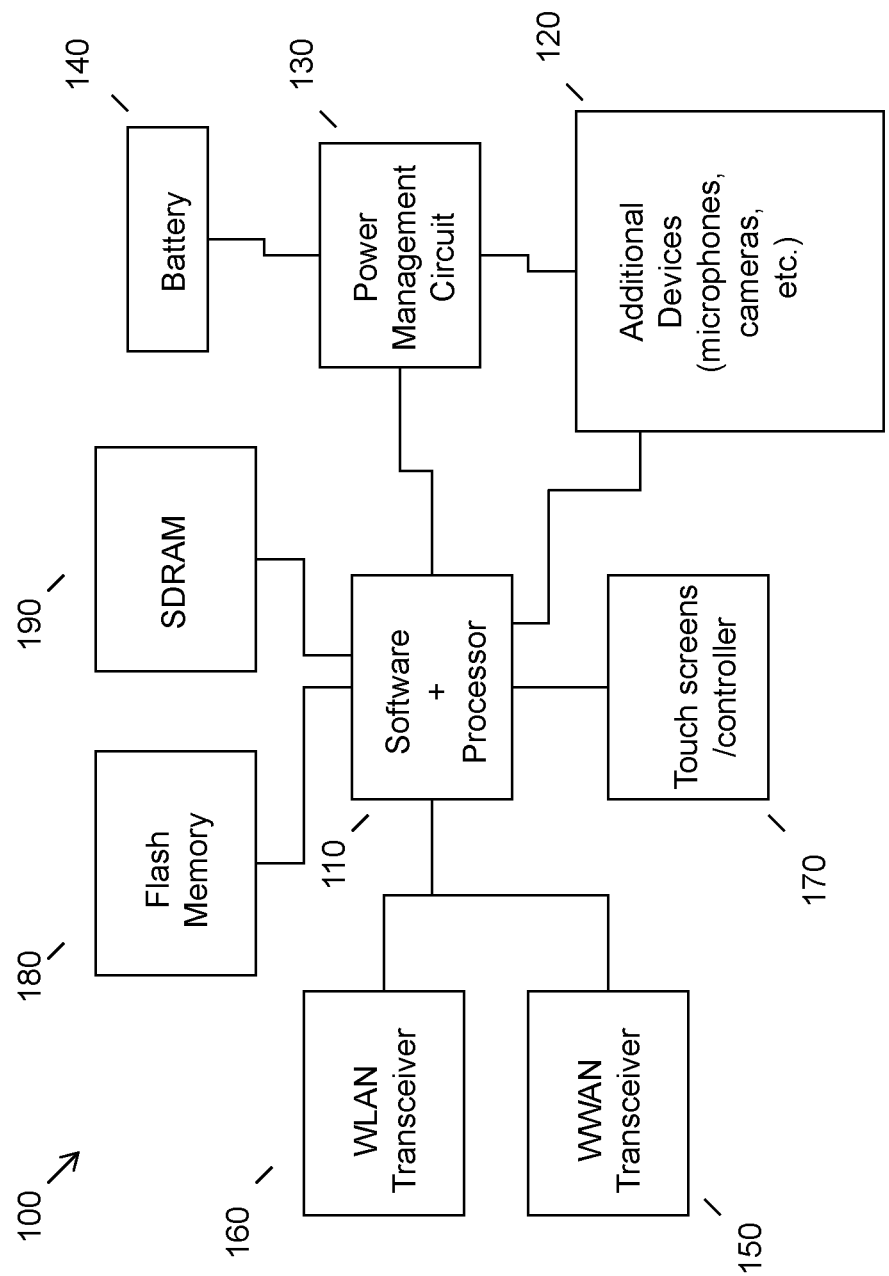
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Traditional approaches to natural language processing ("NLP") (e.g., one-hot encoding and bag-of-words models, etc.) have been historically useful in facilitating certain machine learning tasks (e.g., identifying spam emails, etc.). However, these conventional approaches do not capture information about a word's broader meaning and utilization, which thereby prevents important contextual information from being captured across collections of words (e.g., syntactic and/or semantic relationships between words, etc.). For instance, the systems of the foregoing are unable to determine that the words "dog" and "cat" both refer to animals that are frequently discussed in the context of domestic pets. Accordingly, these limitations prevent traditional systems from effectively performing more complex tasks such as speech recognition and transcription.

Advances in technology have led to the discovery and prevalent utilization of word vectors in NLP. Word vectors are capable of representing words as multidimensional numbers, where contextually similar words are mapped to proximate points in geometric space. These associations may enable a system to conclude that words such as "keyboard" and "mouse" should have similar word vectors to the word "computer", whereas the word "sky" should be quite distant. Additionally, existing word vector techniques are able to recognize the part of speech that words are used as (e.g., noun, verb, etc.) and thereafter adjust the vector representation based on the part of the speech. In a similar vein, "phrase to vector" technology enable phrases, instead of just words, to be embedded into a vector space.

Conventional word vector NLP techniques are not without their shortcomings. More particularly, while word-vectors can reveal a great deal about the meaning of language, they fail in cases in which different intonations are used for the same words and/or phrases. Stated differently, without having knowledge of how something was said, the system only has what was said to work with. For example, the three statements, "He already left.", "He already left?", and "He already left!" have very different expressive meanings. However, as the most common method of converting words into vector space disregards punctuations, the differences in meaning between the three statements will not be reflected by conventional word vector embedding. With these differences ignored, a system may not be able to perform a correct or desired function.

Accordingly, an embodiment provides a method for determining how audible user input is provided and thereafter performing a function based on this determination. In an embodiment, audible user input may be received at a device. An embodiment may then determine an intonation with which the audible user input was provided by the user. Through this determination, an embodiment may assign an expressive meaning to the audible user input (e.g., a regular statement, an inquisitive expression, a surprised expression, etc.) and perform, based on the expressive meaning, a corresponding function. Such a method may enable systems to better understand and process audible user input.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
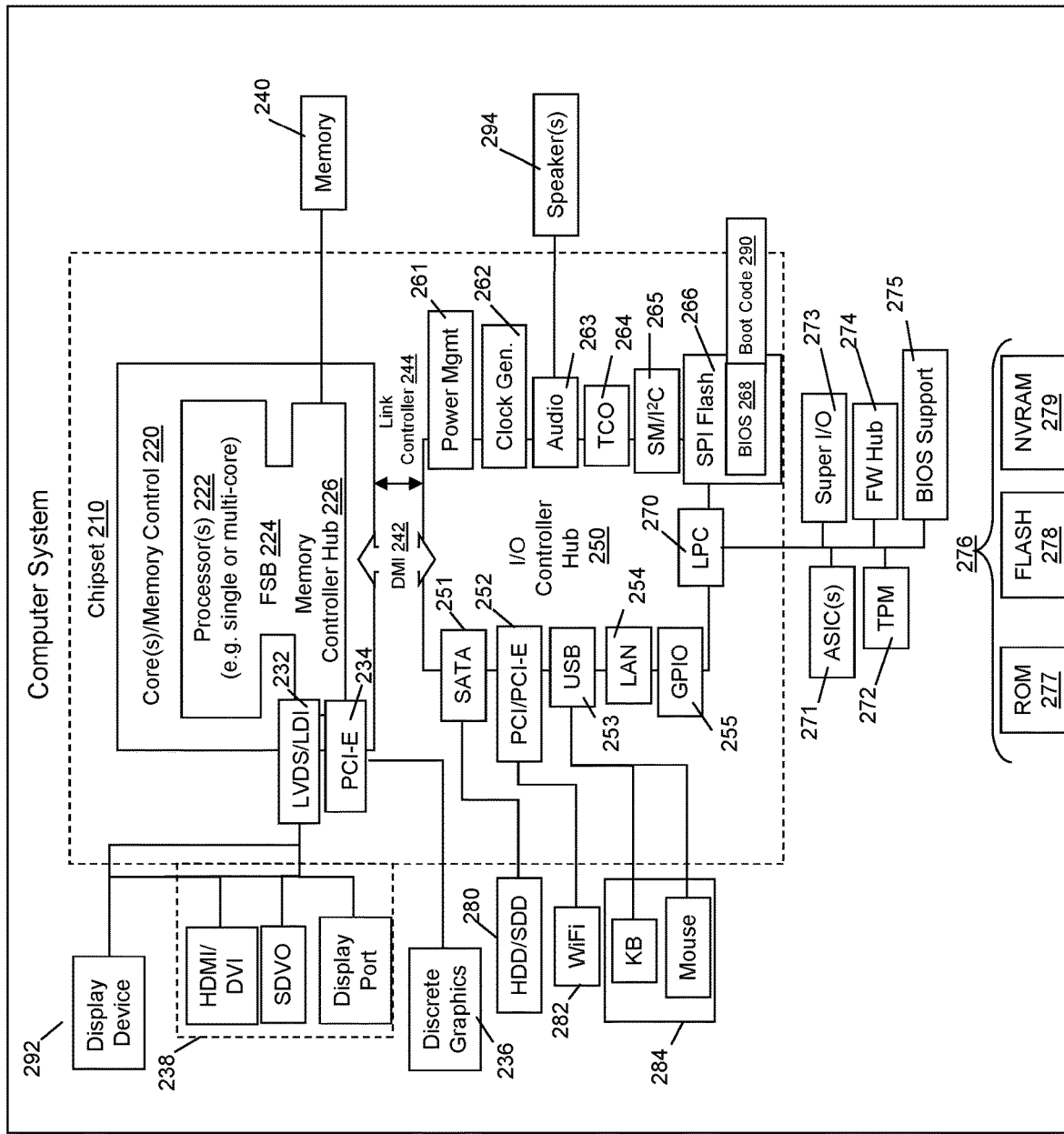
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices capable of receiving audible user input, processing it, and thereafter providing audible output. For example, the circuitry outlined in FIG. 1 may be implemented in a smart phone or tablet embodiment, whereas the circuitry outlined in FIG. 2 may be implemented in a laptop.

Figure 3:
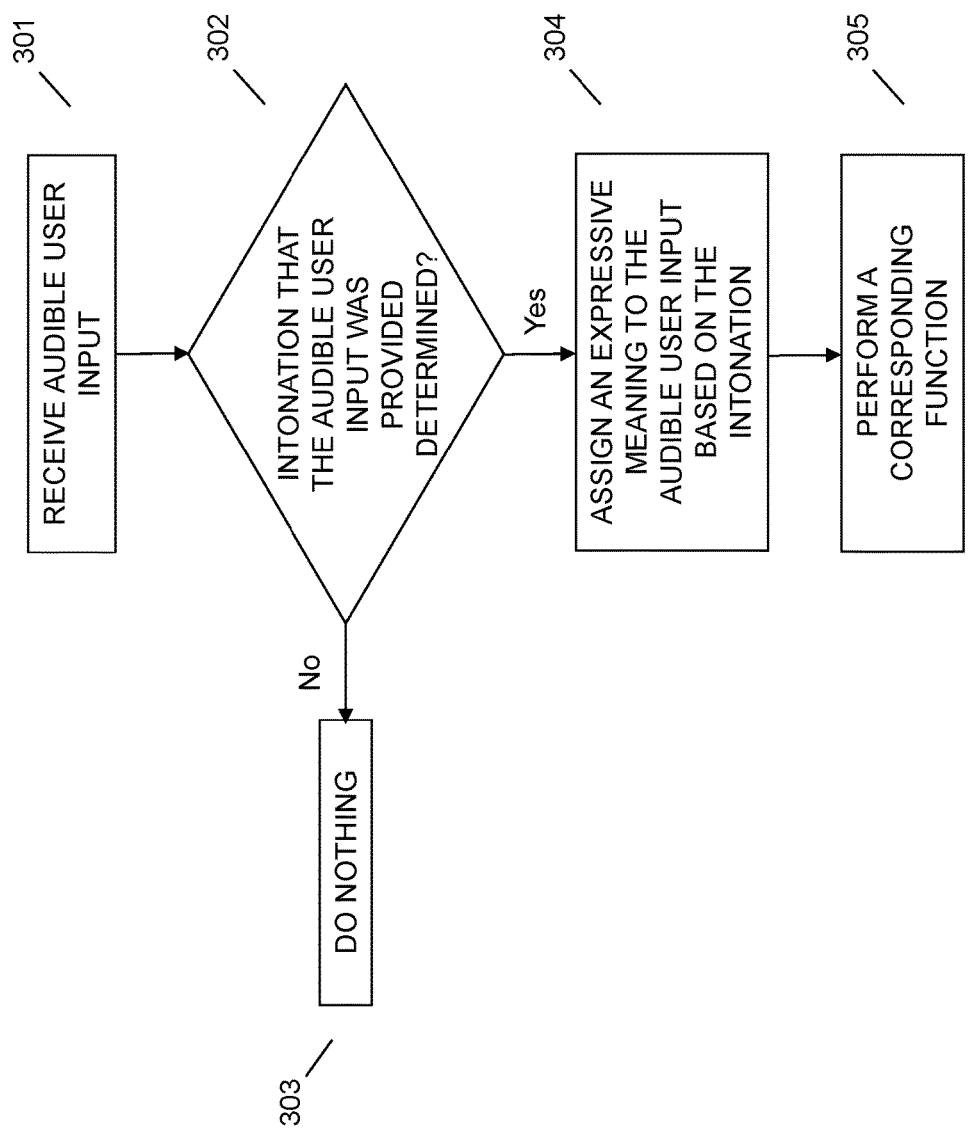
FIG. 3 illustrates an example method of performing a function based upon a determined intonation associated with audible user input.

Referring now to FIG. 3, an embodiment may perform a function based upon a determined intonation associated with received audible user input. At 301, an embodiment may receive, or detect, audible user input. In an embodiment, the audible user input may be captured using one or more audio capture devices (e.g., microphones, etc.) integrally or operatively coupled to the device. The audible user input may consist of a single word or, alternatively, a grouping of words (i.e., a phrase).

In an embodiment, the audible user input may be either directed audible input or passive audible input. Regarding the former, directed audible input may refer to input intended to be provided by a user to a device (e.g., by provision of a wake word that address the device followed by user-provided audible input, etc.). Regarding the latter, passive audible input may refer to input not intended to be directed to a device (e.g., a casual statement expressed by the user, a conversation occurring between the user and another individual, etc.).

At 302, an embodiment may determine an intonation with which the audible user input was provided. An intonation may be reflective of how a user's voice rises and falls during their audible input. Intonation information may be utilized, for example, to indicate the attitudes and emotions of a speaker, to signal the difference between statements and questions, to focus attention on important elements in a message, and the like. In the English language the three main patterns of intonation are filling intonation, rising intonation, and fall-rise intonation. In an embodiment, the intonation may be determined by utilizing one or more linguistic and/or pitch analysis processes known in the art.

Responsive to not determining, at 302, an intonation associated with the audible user input, an embodiment may at 303, take no additional action. Conversely, responsive to determining, at 302, an intonation associated with the audible user input, an embodiment may, at 304, assign an expressive meaning to the audible user input. In an embodiment, the expressive meaning may correspond to one of: a regular expression, an inquisitive expression, or a surprised expression.

In an embodiment, the expressive meaning may be identified and assigned substantially solely based on the determined intonation. For example, responsive to identifying that audible user input was provided with a falling intonation, an embodiment may conclude that the expressive meaning of the audible user input corresponds to a regular expression. As another example, responsive to identifying that audible user input was provided with a rising intonation, an embodiment may conclude that the expressive meaning of the user input corresponds to either an inquisitive expression or a surprised expression. Differentiation between an inquisitive expression and a surprised expression may be accomplished, for example, by identifying the level of intonation change in the audible user input and/or the point in the audible user input the intonation was detected. For example, conventional surprised expressions are provided with a higher level of energy than inquisitive expressions. As another example, conventional inquisitive expressions contain a gradual intonation change throughout the course of the user input (e.g., "Did you like it?", "Is he waking up?", "Are they coming?", etc.) whereas conventional surprised expressions contain an intonation change at the beginning and/or throughout the majority of the user input (e.g., "What!", "Stop it!", "How can you do that!", etc.). Other conventional methods for differentiating between inquisitive and surprised expressions, not explicitly described here, may also be utilized.

In another embodiment, the expressive meaning may be identified by utilizing intonation metadata. More particularly, an intonation value may be identified and thereafter compared to training data (e.g., stored in an accessible database, etc.) that associates a particular intonation value with an expressive meaning. Based on this comparison, a vector embedding associated with a particular expressive meaning may be determined from a present intonation value.

Additionally or alternatively to the foregoing, responsive to receiving the audible user input and determining an intonation associated with that input, an embodiment may proceed to transcribe the audible input to text. The transcription may involve including a punctuation associated with the intonation into the transcribed text. For example, transcribed input determined to be associated with a falling intonation may terminate in a period whereas transcribed input determined to be associated with a sharp, rising intonation may terminate in an exclamation point. Working from the punctuations present in the transcribed text, an embodiment may be able to differentiate similar transcriptions from each other by assigning each similar transcription a different real-vector value. From these vector values, expressive meanings associated with the user input may be identified.

At 304, an embodiment may perform a corresponding function based on the expressive meaning associated with the audible user input. For instance, if the audible user input corresponds to an inquisitive expression, an embodiment may provide, if available and/or obtainable, an answer to the user's inquisitive statement. As an example, if the audible user input is "He already left?", an embodiment may identify the inquisitive nature of the input and provide (e.g., via audible input, visual output, a combination thereof, etc.) a responsive answer such as "Yes". In another instance, if the audible user input corresponds to a surprised expression, an embodiment may provide a contextual explanation regarding why a user may be surprised. As an example, if the audible user input is "He already left!", an embodiment may identify the surprised nature of the input and provide an answer that provides the user with additional context such as "Yes, he left 15 minutes ago to make a scheduled 2:00 pm meeting".

In an embodiment, responsive to identifying an intonation associated with the input, an embodiment may be able to replace or substitute all, or a portion of, the input with another word or phrase in the vector space that maintains the same expressive meaning dictated by the intonation. In essence, the substitute word or phrase is an emotionless version of the original input. For example, an embodiment may utilize "excited" or "surprised" as a replacement for the audible input "wow!".

The various embodiments described herein thus represent a technical improvement to conventional methods for facilitating speech to text processes. Using the techniques described herein, an embodiment may first receive audible user input. An embodiment may then determine an intonation associated with the audible user input and assign, based on the determined intonation, an expressive meaning to the audible user input. Once this meaning is assigned and the context of the audible user input is identified, an embodiment may perform one or more corresponding functions. Such a method enriches conventional speech to text processes by recognizing how a piece of audible user input was provided rather than simply recognizing what the piece of audible user input was.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
receiving, at an information handling device, audible user input;
determining, subsequent to the receiving, an intonation with which the audible user input was provided;
assigning, based on the determined intonation, an expressive meaning to the audible user input; and
performing, based on the expressive meaning, a corresponding function;
wherein the assigning the expressive meaning comprises transcribing the audible user input to text and assigning, based on the determined intonation, a punctuation to the text;
wherein the assigning the expressive meaning comprises modifying a word-vector associated with the text based on the intonation.

2. The method of claim 1, wherein the intonation corresponds to one of: a rising intonation and a falling intonation.

3. The method of claim 1, wherein the expressive meaning is an expression corresponding to a regular expression.

4. The method of claim 1, wherein the expressive meaning is an expression corresponding to an inquisitive expression and wherein the performing the corresponding function comprises providing an answer to the inquisitive expression.

5. The method of claim 1, wherein the expressive meaning is an expression corresponding to a surprised expression and wherein the performing the corresponding function comprises providing a contextual explanation for a topic associated with the surprised expression.

6. The method of claim 1, wherein the punctuation comprises a punctuation selected from the group consisting of a period, a question mark, and an exclamation point.

7. The method of claim 1, wherein the performing the corresponding function comprises performing based on the modified word-vector.

8. The method of claim 1, further comprising replacing the text with at least one other word that maintains the expressive meaning.

9. An information handling device, comprising:
a processor;
a memory device that stores instructions executable by the processor to:
receive audible user input;
determine, subsequent to the receiving, an intonation with which the audible user input was provided;
assign, based on the determined intonation, an expressive meaning to the audible user input; and
perform, based on the expressive meaning, a corresponding function;
wherein the instructions executable by the processor to assign the expressive meaning comprise instructions executable by the processor to transcribe the audible user input to text and assign, based on the determined intonation, a punctuation to the text;
wherein the instructions executable by the processor to assign the expressive meaning comprise instructions executable by the processor to modify a word-vector associated with the text based on the intonation.

10. The information handling device of claim 9, wherein the intonation corresponds to one of: a rising intonation and a falling intonation.

11. The information handling device of claim 9, wherein the expressive meaning is an expression corresponding to a regular expression.

12. The information handling device of claim 9, wherein the expressive meaning is an expression corresponding to an inquisitive expression and wherein the instructions executable by the processor to perform the corresponding function comprise instructions executable by the processor to provide an answer to the inquisitive expression.

13. The information handling device of claim 9, wherein the expressive meaning is an expression corresponding to a surprised expression and wherein the instructions executable by the processor to perform the corresponding function comprise instructions executable by the processor to provide a contextual explanation for a topic associated with the surprised expression.

14. The information handling device of claim 9, wherein the instructions executable by the processor to perform the corresponding function comprise instructions executable by the processor to perform based on the modified word-vector.

15. The information handling device of claim 9, further comprising instructions executable by the processor to replace text with at least one other word that maintains the expressive meaning.

16. A product, comprising:
a storage device that stores code, the code being executable by a processor and comprising:
code that receives audible user input;
code that determines, subsequent to the receiving, an intonation with which the audible user input was provided;
code that assigns, based on the determined intonation, an expressive meaning to the audible user input; and
code that performs, based on the expressive meaning, a corresponding function;
wherein the code that assigns the expressive meaning comprises code that transcribes the audible user input to text and assigns, based on the determined intonation, a punctuation to the text;
wherein the code that assigns the expressive meaning comprises code that modifies a word-vector associated with the text based on the intonation.

\* \* \* \* \*